Nov. 14, 1967  G. W. BAKER ET AL  3,352,513
HELICOPTER ROTOR SHAFT AND ROTOR BLADE SEVERING MEANS
Filed March 25, 1966  2 Sheets-Sheet 1

INVENTORS
GEORGE W. BAKER
RYLAND D. WISEMAN, JR.

BY Claude Funkhouser
ATTORNEY

Neal E. Abrams
AGENT

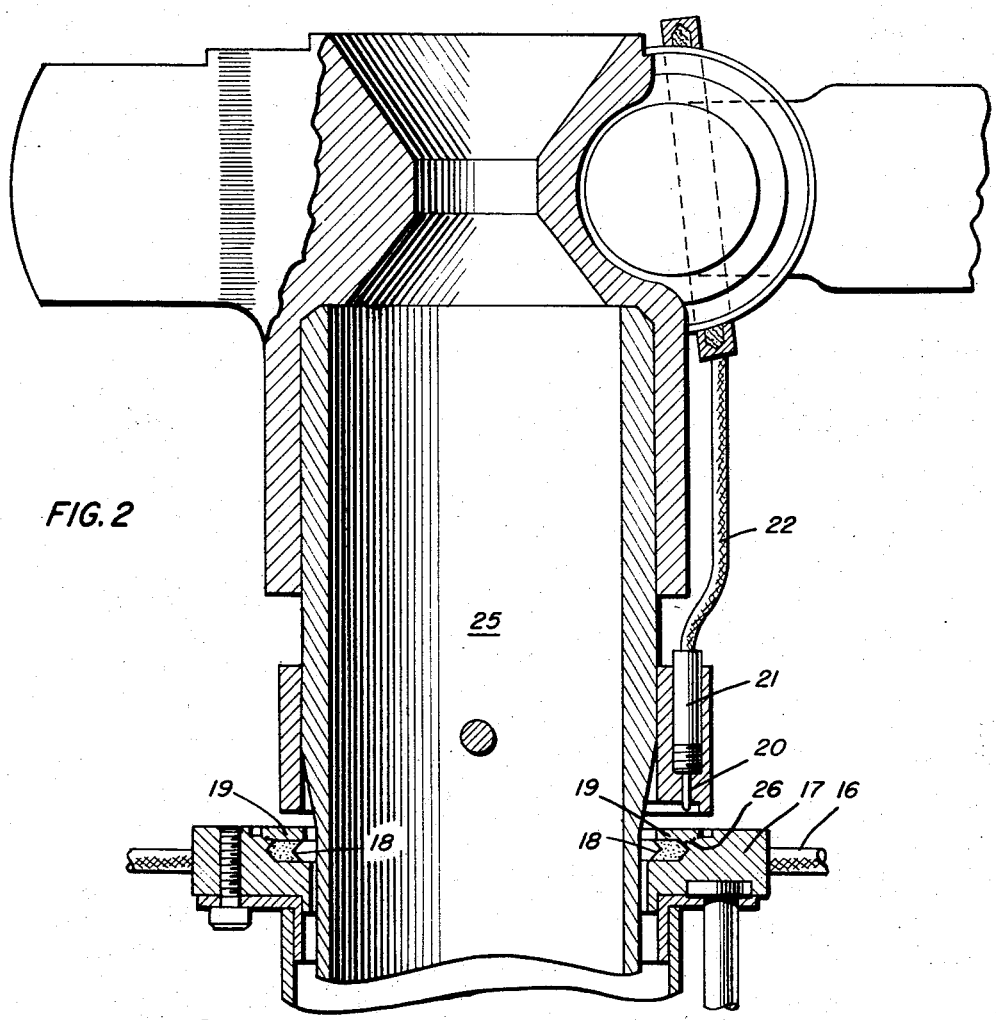
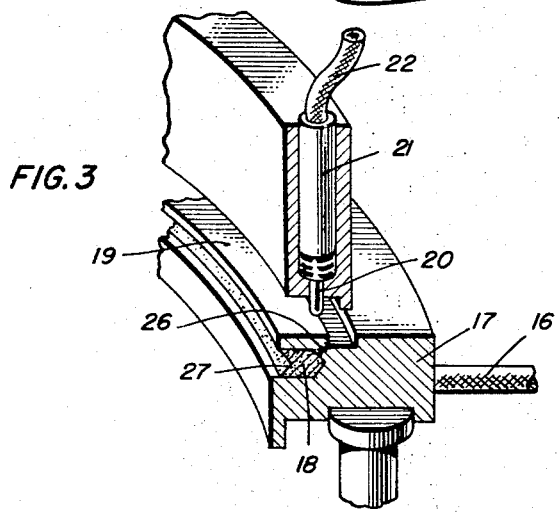

United States Patent Office 3,352,513
Patented Nov. 14, 1967

3,352,513
HELICOPTER ROTOR SHAFT AND ROTOR
BLADE SEVERING MEANS
George W. Baker and Ryland D. Wiseman, Jr., Dahlgren,
Va., assignors to the United States of America as represented by the Secretary of the Navy
Filed Mar. 25, 1966, Ser. No. 538,902
3 Claims. (Cl. 244—17.15)

The invention described herein may be manufactured and used by or for the Government of the United States of America for governmental purposes without the payment of any royalties thereon or therefor.

This invention pertains generally to helicopter escape systems and more particularly to a means for jettisoning the rotor shaft and blades to allow escape of personnel from the helicopter.

The wide spread use of helicopters in recent years has fostered the development of many techniques for escape of personnel in case of an emergency. By the very nature of its design, the helicopter does not lend itself well to such escape systems as free parachuting or ejection since the escapee must contend with the movements of the large diameter rotor blades usually located directly overhead the cockpit. Development in the prior art has therefore centered about encapsulating the crew compartment of the helicopter and then parachuting it to the ground. However, in these designs the rotor blades must be contended with, and those rotor blade ejector devices used in the prior art lend themselves only to helicopters in which the engines are mounted on the rotor blades themselves or in which the entire engine and rotor blades can be easily jettisoned. Obviously, this encompasses very few designs of helicopters and covers no helicopter which is in actual service today.

The instant invention provides a means utilizing an explosive power train and a shaped charge to sever the rotor blade drive shaft and to remove all but one of the rotor blades; the remaining blade carries away the hub assembly and severed shaft. It therefore provides an easily operated and expeditious means for removing the offending parts of the helicopter so that the crew's compartment can be easily encapsulated and parachuted to earth.

It is therefore the principal object of this invention to provide a means for quickly and expeditiously removing the rotor blades from a helicopter.

Another object of this invention is to provide a means for removing the rotor blades from a helicopter by explosive means.

Still another object of this invention is to provide a means for removing the rotor blades from a helicopter, which means are safe, of extremely light weight, of high reliability, and which add a minimum of equipment to the aircraft.

Other objects, advantages and novel features of the invention will become apparent from the following detailed description when considered in conjunction with the accompanying drawings wherein:

FIG. 2 is a vertical section of a helicopter rotor shaft and hub assembly shown equipped with the means of the instant invention;

FIG. 3 is a close-up view in section of the driver plate assembly;

Figure 1:
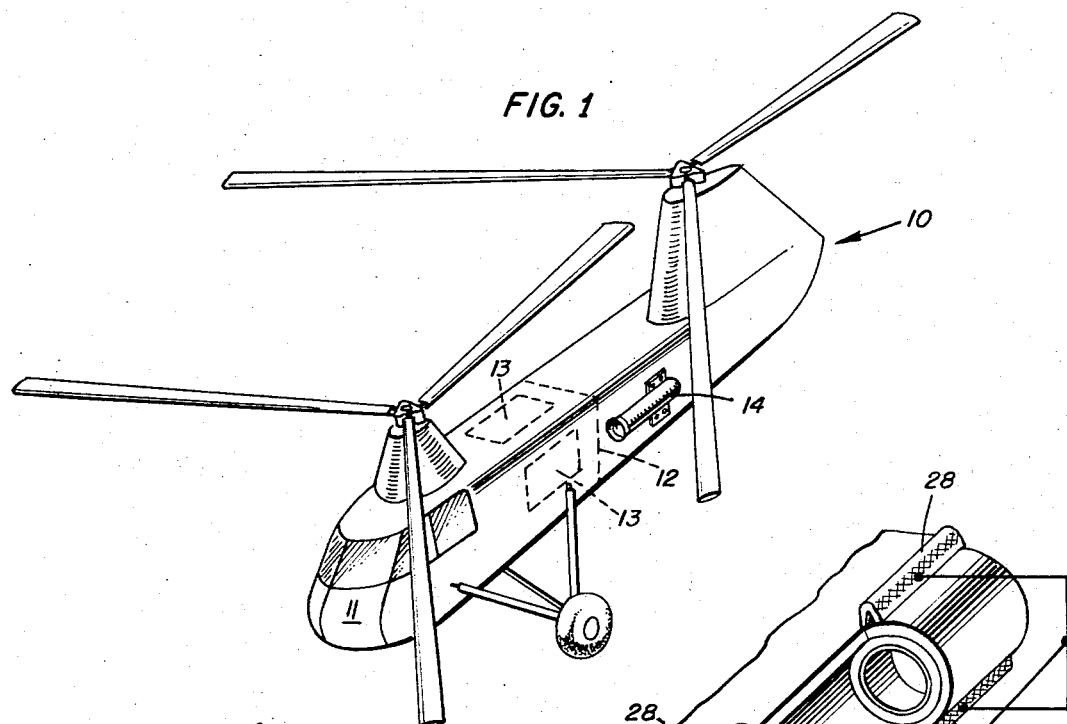
FIG. 1 is a diagrammatic view of a helicopter provided with the elements of the instant invention.

In FIG. 1 is shown a type of helicopter 10 which can be easily equipped with the elements of the instant invention. This helicopter 10 is equipped with a system for encapsulating the crew compartment 11 by cutting through the fuselage frame members, wiring, drive shaft, etc., at a point midway in the fuselage of the aircraft as shown in the drawings at 12. The forward portion 11 of the helicopter is equipped with a plurality of parachutes 13 which are preferably deployed by rockets or other explosive means in order to render them effective at lower altitudes. It is also advantageous to include rocket means 14 on the rear portion of the fuselage in order that it may be positively moved away from the encapsulated portion 11 so not as to interfere with the deploying of the parachutes 13. The means to effect the cutting of the fuselage of the helicopter is not a subject of this application but a preferred means for severing cables and wires can be found in copending U.S. patent application No. 634,813, filed Apr. 26 1967. Since time is of the essence once the emergency has been sensed by the pilot of the helicopter, initiation of the emergency escape system is done immediately and is usually accomplished by electronic or mechanical means mounted on the control stick of the aircraft, and it is intended that the helicopter rotor shaft and blade jettison means be initiated by the same action which starts the encapsulation procedure. In order to expeditiously remove the rotor shaft and blades from overhead of the crew compartment it is necessary to transmit energy from the stationary helicopter fuselage to the rotating blade hub and hence to the blades. By the instant invention this is accomplished by means of an explosive powder train which is initiated by the pilot. The explosive cord itself, while not a subject of the instant invention, is preferably of the type of light weight and light powder grain dispersion which operates on a shock wave principle and is commercially available from several sources under the name of Confined Detonating Cord. In any event, and as shown in FIG. 2, the explosive train is carried from the initiating point through a confined detonating cord 16 to an explosive ring 17 which contains a shaped charge 18 and a driver plate 19, this mechanism being of the type described in copending U.S. patent application No. 538,910, filed Mar. 28, 1966. The charge 18 is set off by communication with confined detonating cord 16. The explosion of this charge 18 severs the driver plate 19 and drives it upward into contact with an energy probe 20 which in turn contacts and explodes an initiator 21 to continue the chain of explosive through another confined detonating cord section 22. Charge 18 has also an inner shaped charge portion so that the explosion of it fires into and severs rotor drive shaft 25. The close-up view of the apparatus, FIG. 3, shows that the driver plate 19 splits away from explosive ring 17 at a point around the circumference 26 and this detail also shows the shaped charge portion of explosive 18, which is indicated at 27. Once the explosive powder train is communicated to detonating cord 22 it is passed upward to the rotor hub of the helicopter where it is communicated to all but one of the rotor blades. In the case of the example shown it would be two out of the three helicopter blades.

Figure 4:
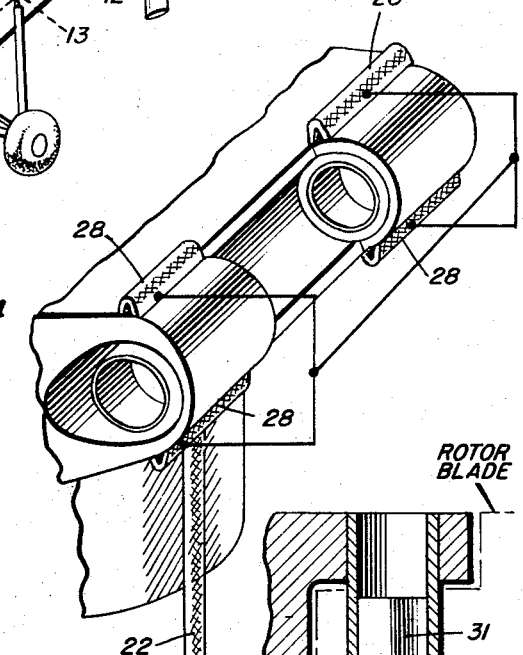
FIG. 4 is a close-up view of a section of the helicopter rotor hub as provided by the instant invention.
Figure 5:
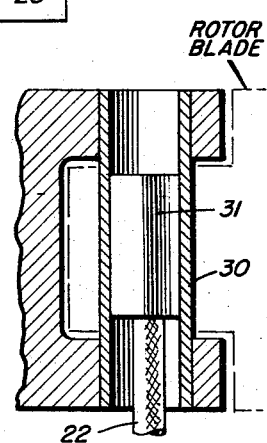
FIG. 5 shows a rotor anchoring pin constructed in accordance with a preferred alternate embodiment of the invention.

In accordance with the instant invention it is now necessary to sever all but one of the rotor blades from the rotor hub. This can be done by any one of several preferred methods, two of which are shown in FIGS. 4 and 5. In FIG. 4 the explosive powder train is passed from the confined detonating cord 22 upward to a series of shaped charges 28 which are mounted adjacent those portions of the rotor hub which hold the anchor poins for the individual blades. Upon communication of the explosive powder trains to these shaped charges 28 the charges fire and sever the outer sections of the pin holding elements from the hub thus allowing the entire blade to fly free, a further contributing factor being the inertia built up by the rotating mass.

Figure 6:
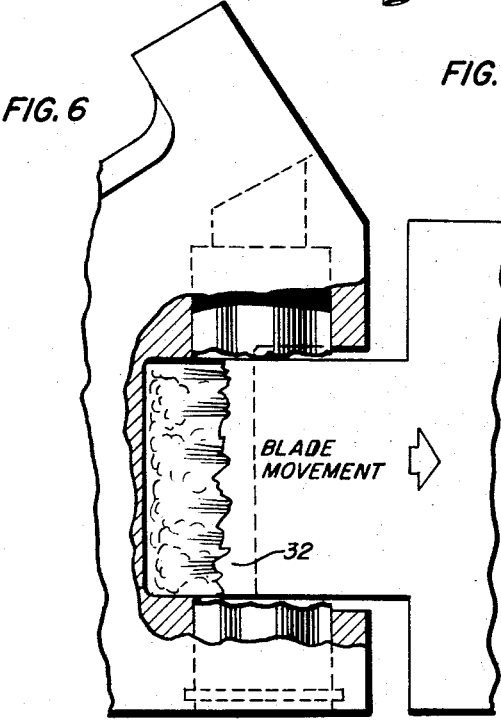
FIG. 6 is a view of the movement of the blade upon explosion of the pin shown in FIG. 5.

A second preferred method of severing the blades from the rotor shaft is shown in FIGS. 5 and 6. In FIG. 5 the blade holding pin 30 is hollow and contains a section of explosive 31 which is in communication with the confined detonating cord 22. Upon firing of explosive 31 the pin 30 is split, as is the root section 32 of the helicopter blade, and by this action plus the inertia of the rotating mass, the blade is severed from the hub and thrown free.

As hereinbefore stated all but one of the helicopter blades are severed from the rotor hub. By this method the remaining blade will remove the rotor hub and the segment of the drive shaft remaining attached to it from the area of the helicopter by virtue of the inertia it has built up and the fact that the remaining blades have been severed from the rotor hub.

The operation of the instant invention is as follows: Upon the sensing of an emergency in the helicopter and upon the pilot's decision to abandon the craft, the emergency system is activated. In the preferred system, the personnel compartment of the helicopter is severed from the rest of the fuselage and encapsulated along line 12 in FIG. 1 and the forward blades and rotor assembly are jettisoned prior to deployment of parachutes 13. At the same time, in the preferred embodiment, a plurality of rockets 14 insures the moving of the remainder of the fuselage portion away from the encapsulated portion. Concurrently, the blade removal system is being activated and the explosive powder train is begun through confined detonating cord 16, which cord communicates explosive to element 17 and hence to shaped charge 18 and driver plate 19. The firing of this shaped charge 18 cuts rotor shaft 25 at that point and also fires driver plate 19 upward to contact probe 20, firing igniter 21 and continuing the explosive powder train through confined detonating cord 22 up to the blades. It must be borne in mind at this point that there must be at least one initiator and confined detonating cord leading to each of the blades which is to be severed. The energy is communicated through confined detonating cord 22 up to the rotor hub assembly and hence to either a series of shaped charges 28 shown in FIG. 4, which remove a portion of the hub assembly to release the blades, or to the charges 31 shown in FIG. 5 embedded in the center of each of the blade holding pins, which upon explosion severs the pin and the blade root and allows each of the blades to fly free. The blade remaining attached to the hub then carries the rotor hub and the stub shaft portion away from the personnel section of the helicopter. As soon as this is done, and preferably by continuing sequential explosive means, parachutes 13 are deployed and the encapsulated section of the helicopter lowered safely to earth.

It is thus seen that by the instant invention a simple, safe, and very reliable means for performing one of the basic functions of helicopter emergency escape systems is presented. By the use of modern explosive powder trains such as the aforedescribed confined detonating cord, weight is kept at a minimum with no sacrifice in reliability. The system affords a simple means for the sequential operation of the various elements including a novel means for severing the rotor blade shaft while still continuing to pass the explosive energy from a stationary to a rotating object. Furthermore, the instant invention presents a new and novel means for severing the helicopter blades from the hub assembly and for carrying the hub assembly and the severed stub shaft away from the machine.

Obviously many modifications and variations of the present invention are possible in the light of the above teachings. It is therefore to be understood that within the scope of the appended claims the invention may be practiced otherwise than as specifically described.

What is claimed is:

1. In a helicopter having at least one rotor shaft and hub and a plurality of rotor blades attached thereto, and further having a personnel escape system including a crew's compartment, at least one parachute deployable from said crew's compartment, and means for encapsulating said crew's compartment;

means for jettisoning said rotor blades comprising;
  a shaped explosive charge ring disposed circumferentially about said rotor shaft and oriented toward said shaft;
  a driver plate in juxtaposition to said explosive charge ring and adapted to be moved thereby;
  at least one energy probe fixedly attached to and rotating with said rotor shaft, each pick-up probe being in communication with an explosive ignitor;
  explosive means on said rotor adjacent all except one of said rotor blades;
  explosive powder train means communicating with said explosive ignitor and said explosive means on said rotor; and
  means for causing said shaped explosive charge ring to fire, whereby said shaped charge will sever said rotor shaft and will drive said driver plate into said pick-up probes, firing said ignitors and said explosive powder trains and, hence, causing said explosive means on said rotor to sever all except one of said blades from said hub allowing said blades to fly free, the remaining blade to fly free carrying said hub and the severed portion of said shaft.

2. The structure defined in claim 1 wherein said explosive means on said hub comprises a plurality shaped charge on said rotor hub adjacent the root of each of all except one of said rotor blades and oriented such that said rotor hub will be severed, whereby said blades are thrown free.

3. The structure of claim 1 wherein said rotor blades are each attached to said rotor hub by means of an anchor pin and wherein said explosive means on said hub comprises an explosive charge in each of said anchor pins, whereby explosion of said charges will rupture said anchor pins and allow said blades to be thrown free.

References Cited

UNITED STATES PATENTS 3,229,931   1/1966   Larsen _____ 244—17.11

MILTON BUCHLER, *Primary Examiner.*

R. A. DORNON, *Assistant Examiner.*